United States Patent [19]

Schubert

[11] Patent Number: 5,177,050
[45] Date of Patent: Jan. 5, 1993

[54] SULFUR ABSORBENTS

[75] Inventor: Paul F. Schubert, Campbell, Calif.

[73] Assignee: Phillips Petroleum Company, Bartlesville, Okla.

[21] Appl. No.: 808,342

[22] Filed: Dec. 16, 1991

[51] Int. Cl.⁵ .................. B01J 20/08; B01D 53/00; C01B 17/16; C01B 17/04
[52] U.S. Cl. .................. 502/415; 55/73; 423/230; 423/244.06; 502/208
[58] Field of Search .................. 502/415, 414, 208

[56] References Cited

U.S. PATENT DOCUMENTS

| | | | |
|---|---|---|---|
| 3,848,071 | 11/1974 | Groenendaal | 423/574 |
| 4,044,114 | 8/1977 | Dezael et al. | 423/574 R |
| 4,376,067 | 3/1983 | Vogel et al. | 502/208 |
| 4,519,992 | 5/1985 | Alkhazov et al. | 423/230 |
| 4,797,268 | 1/1989 | McGovern et al. | 423/574 R |

*Primary Examiner*—Paul E. Konopka
*Attorney, Agent, or Firm*—Charles W. Stewart

[57] ABSTRACT

A sulfur absorbent composition having desirable physical properties and comprising zinc oxide and alumina having been treated with a phosphating agent is disclosed. At least a portion of the alumina component of the absorbent composition undergoes a phosphating treatment. The resulting composition is suitable for use in an $H_2S$ absorption process.

52 Claims, 1 Drawing Sheet

FIG. 1

SULFUR ABSORBENTS

This invention relates to sulfur absorbent compositions, the manufacture of sulfur absorbents and their use.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of from about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Various absorption compositions have been used to remove sulfur from fluid streams when the sulfur is present as hydrogen sulfide. These absorption compositions can be manufactured by a variety of methods which include, for example, extrusion production techniques. A problem that is often encountered in the production of these absorption compositions is equipment wear caused by the abrasive nature of the absorption materials being manufactured. In certain attempts to produce commercial quantities of absorbent compositions, excessive equipment wear and downtime caused by the abrasive characteristics of the absorption material components have, in effect, rendered the production of such compositions commercially unviable.

A further property which it is desirable for absorption compositions to have is the ability to absorb large quantities of sulfur. This capability to absorb large amounts or concentrations of sulfur is sometimes referred to as "sulfur loading" and is generally reported in terms of percent sulfur loading. The term "percent sulfur loading" is generally defined as the parts by weight of sulfur absorbed upon the surface or within the pores of an absorption composition per parts by weight of the total absorbent composition multiplied by a factor of 100. It is desirable to have an absorption composition with the largest possible sulfur loading capacity.

An additional property desirable for an absorption composition to have is the ability to be regenerable to the original absorbing composition state after the absorbing composition has become spent. An absorbing composition generally becomes spent when its sulfur loading capacity has essentially been used up. It is desirable for the absorbing composition to be able to undergo numerous regeneration cycles without losing its sulfur loading capacity and other desirable properties.

Even though many absorbing compositions can effectively absorb hydrogen sulfide from fluid streams containing hydrogen sulfide, it is not uncommon for many of these absorbing compositions to effectively oxidize significant amounts of hydrogen sulfide to sulfur dioxide when contacted with such fluid streams. The resulting sulfur dioxide is not removed from the fluid stream by the absorbent composition and thus passes through the absorbent material with the effluent fluid stream. This phenomena is sometimes called "sulfur slippage." It is desirable to have an absorption material which has a high capacity to absorb sulfur from a fluid stream and which minimizes the amount of sulfur slippage.

While it is possible to use various compounds that can absorb hydrogen sulfide from fluids that are contaminated with hydrogen sulfide, many of these compounds are unsuitable for commercial use as absorbents due to insufficient crush strength to withstand process operating conditions without excessive degradation. An absorbent with a low crush strength often is susceptible to attrition by chipping and fracture of the surfaces of an agglomerate of the absorbent during its use in commercial processes thereby rendering such an absorbent economically ineffective.

It is, thus, an object of the present invention to provide an improved absorption composition having the desirable properties of high sulfur loading capacity, high crush strength, the ability to be repeatedly regenerated without the loss of certain desirable absorbent properties, and the ability to be employed in a hydrogen sulfide absorption process with a minimum of sulfur slippage.

It is another object of the present invention to provide a method of producing absorbents that have certain desirable properties such as, for example, high sulfur loading capacity, high crush strength, the ability to be repeatedly regenerated without the loss of certain desirable absorbent properties, and the ability to be employed in a hydrogen sulfide absorption process with a minimum of sulfur slippage.

Another object of the present invention is to provide an improved method for removing sulfur compounds from fluid streams containing contaminating quantities of said sulfur compounds.

A still further object of this invention is to provide an improved process for removing sulfur from hydrogen sulfide containing fluid streams whereby sulfur slippage is minimized.

In accordance with this invention, there is provided a method of making an absorbent composition comprising treating an alumina material with a phosphating agent to produce a treated alumina. The treated alumina is mixed with zinc oxide to produce a mixture comprising zinc oxide and the treated alumina which is thereafter agglomerated to form an agglomerate.

Another aspect of this invention includes a method of making an absorbent composition comprising agglomerating a mixture comprising zinc oxide and alumina; and, thereafter, treating the mixture with a phosphating agent to provide a phosphated mixture wherein at least a portion of the alumina is converted into aluminum phosphate.

In accordance with yet another aspect of this invention, there is provided a method of making an absorbent composition comprising mixing zinc oxide, alumina, and a phosphating agent to produce a treated mixture. The treated mixture is agglomerated to produce an agglomerate composition.

In a still further aspect of this invention, there is provided an absorbent composition having certain desirable physical properties comprising zinc oxide and alumina which has been treated with a phosphating agent. Alternatively, the novel composition of matter of this invention can comprise zinc oxide and phosphated alumina or it can comprise zinc oxide, aluminum phosphate, and alumina.

Other objects, aspects and features of the present invention will be evident from the following detailed description of the invention, the claims and the drawings in which:

The composition of matter of this invention, which is used as an absorbent for removing sulfur compounds from a fluid stream, is a novel composition comprising, consisting of, or consisting essentially of zinc oxide and alumina which has been treated with a phosphating agent. In another embodiment of the invention, the composition of matter can comprise, consist of, or consist essentially of zinc oxide and phosphated alumina. A still further embodiment of this invention is a composition of matter which can comprise, consist of, or consist essentially of zinc oxide, alumina and aluminum phosphate.

It is preferred that the composition of matter of this invention contains a sufficient amount of aluminum phosphate, or alumina having been treated with a phosphating agent, or phosphated alumina to be effective in providing a composition having the desirable properties of high sulfur loading capacity, high crush strength, the ability to be repeatedly regenerated without the loss of certain desirable absorbent properties, and the ability to be employed in a hydrogen sulfide absorption process with a minimum of sulfur slippage. It has been discovered that the novel composition as described herein has the ability to absorb large amounts or concentrations of sulfur or sulfur compounds thereby giving the composition a high sulfur loading capacity which in some instances exceeds the sulfur loading capacity of other known sulfur absorbent compounds. It has been further discovered that the herein described novel composition, when utilized in an absorption process for removing hydrogen sulfide from a process fluid, gives a process having a minimum of sulfur slippage and which produces a treated process stream. Furthermore, the composition of this invention, if it is properly manufactured by the methods described herein, which includes proper drying, calcination, and agglomeration methods, can have significantly high crush strengths which permit the commercial use of the composition in sulfur absorption processes.

The composition of matter of this invention can include a phosphated alumina or an aluminum phosphate or an alumina having been treated with a phosphating agent. The term "phosphate" as used herein includes orthophosphates, pyrophosphates, methaphosphates, and polyphosphates. The aluminum phosphate compounds suitable for use in the composition of matter can be represented stoichiometrically by the formula:

$$M_{n+2}P_nO_{3n+1}$$

where M is the aluminum atom, P is phosphorous, O is oxygen, and n is an integer number of 1 or greater. The alumina compounds which form a portion of the composition of matter of this invention will be in the form of a phosphated alumina or an alumina having been treated with a phosphating agent. The term "phosphated alumina" refers to an alumina material having been subjected to a sulfate treatment or phosphating. The terms phosphate treatment or phosphating are meant to refer broadly to the phosphorous treatment of the alumina material and does not necessarily indicate that the treating agent is a phosphate; although, of course, on activation, the phosphorous will be converted to a phosphate. The phosphating agent can be any source of phosphorous such as phosphorous containing ions, preferably orthophosphoric acid. Alternatively, an orthophosphate such as monoammonium dihydrogen phosphate or diammonium hydrogen phosphate or even a metal phosphate can be used. Alternatively, a phosphorous compound which can be vaporized, such as $POCl_3$ (phosphoryl chloride) or $PCl_3$ (phosphorus trichloride) can be used. While any suitable phosphate can be utilized to prepare the composition of matter of this invention, other suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, cerium, $H_3PO_4$ and $H_3PO_3$. Phosphonic acids such as phenyl phosphonic acids and the metal and ammonium phosphonic acids may also be used to derive phosphates for the composition, if desired. Presently preferred is $H_3PO_4$. The phosphating treatment can be carried out in any suitable manner which will result in converting at least a portion of the alumina of the composition of matter of this invention to an aluminum phosphate thus providing an alumina material which has been treated with a phosphating agent or phosphated alumina that is included in the composition of matter of this invention.

It is desirable to have an amount of aluminum phosphate present in the novel composition effective in providing a composition having a sulfur loading capacity of at least about 18 weight percent, preferably of at least about 20 weight percent; and, most preferably, the sulfur loading capacity should range from about 21 weight percent to about 25 weight percent. It is believed that the amount of aluminum phosphate in the composition of matter of this invention can range upwardly from effective quantities to about 50 weight percent; but, to be most effective, it has been found that the amount of aluminum phosphate present in the composition can range from about 3 weight percent to about 50 weight percent. The preferred amount of aluminum phosphate present in the composition can range from about 4 weight percent to about 25 weight percent and, most preferably, the aluminum phosphate can be present in an amount from about 5 weight percent but less than about 10 weight percent. As used herein, the term "weight percent", when referring to components of the absorption composition, is defined as parts by weight of the given component per 100 parts by weight of the total combined weight of the composition comprising zinc oxide, alumina, and aluminum phosphate multiplied by the factor of 100. In the case where the absorption composition is zinc oxide and alumina having been treated with a phosphating agent, the total combined weight of the absorption composition will be that of the zinc oxide and treated alumina or that of the zinc oxide and phosphated alumina.

The starting alumina component of the composition can be any suitable commercially available alumina material and, generally, those alumina compounds produced by the dehydration of alumina hydrates. A preferred alumina is boehmite alumina. The alumina can also contain minor amounts of other ingredients, such as, for example, 1-10 weight percent silica, which do not adversely affect the quality of the final composition, but it is generally desirable to have an essentially pure alumina as a starting material for the composition of this invention. The starting alumina can be made in any manner well known in the art, examples of which are described at length in Kirk-Othmer *Encyclopedia of Chemical Technology*, 3rd Edition, Vol. 2, pp. 218-240.

As an example, a suitable commercially available starting alumina for use in the composition of this invention is manufactured by Vista Corporation, designated as Catapal D alumina.

The zinc oxide used in the preparation of the absorbing composition can either be in the form of zinc oxide, or in the form of one or more zinc compounds that are convertible to zinc oxide under the conditions of absorption composition preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

Any suitable concentration of zinc oxide can be used in the absorption composition which will inpart the desirable absorbent properties; however, generally, the zinc oxide will be present in the absorption composition in an amount of at least about 30 weight percent. To have the desirable absorbent properties, an effective concentration of zinc oxide can be in the range of from about 30 weight percent to about 60 weight percent. Preferably, zinc oxide can be present in the absorption composition in the range of from about 35 weight percent to about 55 weight percent and, most preferably, the zinc oxide will be present in the composition in the range of from about 40 weight percent to about 50 weight percent.

In the methods of making the novel composition of this invention as described herein, the starting alumina material is treated with a phosphating agent or is phosphated either prior to mixing the thus treated alumina with the zinc oxide component of the composition or during an agglomerating step or mixing step of the components of the composition. At least a portion of the starting alumina component of the composition is converted to aluminum phosphate to give the desired amount of aluminum phosphate in the final composition of matter of this invention. In ceratin circumstances, it can be desirable to convert essentially all of the starting alumina material of the composition to aluminum phosphate; however, generally, only a portion of the starting alumina material is converted to aluminum phosphate. Generally, the starting materials of the composition of matter of this invention should be provided in proportions such that the weight ratio of alumina to zinc oxide will be in the range of from about 0.6-to-1 to about 2.4-to-1. Preferably, the weight ratio of the starting components of alumina to zinc oxide will be in the range of about 0.8-to-1 to about 1.9-to-1; but, most preferably, the weight ratio of the starting components of alumina to zinc oxide can be from 1-to-1 to 1.5-to-1. As previously described, a certain portion of the starting alumina material is converted to give the final composition having an aluminum phosphate content in accordance with the ranges earlier recited herein.

The final alumina concentration in the absorption composition will be such that it will contribute to providing the desirable absorbent properties of high crush strength, high absorption capacity and the ability to minimize the amount of sulfur slippage when the composition is used in a sulfur absorption process. It is generally desirable to have an alumina concentration in the range of from about 40 weight percent to about 70 weight percent. Preferably, the final alumina content can be present in the composition in the range of from about 45 weight percent to about 65 weight percent. Most preferably, the final alumina content can be present in the absorption composition in the range of from about 50 weight percent to about 60 weight percent.

A further embodiment of this invention is for the composition of matter to comprise zinc oxide and alumina which has been treated with a phosphating agent, as herein defined, or, in the alternative, to comprise zinc oxide and a phosphated alumina material. This phosphated alumina material or alumina having been treated with a phosphating agent will generally be a mixture comprising alumina and aluminum phosphate. The composition of matter of this invention can therefore have aluminum phosphate present from an effective quantity up to about 50 weight percent of the total weight of the composition; but, the aluminum phosphate present in the composition of matter can be at least about 3 weight percent to about 50 weight percent of the total weight of the composition. Furthermore, one preferred embodiment of this invention is to have aluminum phosphate present in the range of from about 4 weight percent to about 25 weight percent, and most preferably, aluminum phosphate can be present in the composition of matter in the range of from about 5 weight percent to about 10 weight percent.

The composition of matter of this invention, which can be employed as an absorption composition in a process for removing hydrogen sulfide from a fluid stream containing hydrogen sulfide, can be prepared by any suitable method. One preferred method for making the absorbent composition described herein includes the treating of an alumina material with a phosphating agent to produce a treated alumina. The treating of the alumina material can be performed by any suitable method which includes, for example, mixing of alumina with a phosphating agent to form a homogenous mixture. Any suitable method for mixing the components can be used to provide the homogenous mixture. Such suitable types of solids-mixing machines can include, but are not limited to, tumblers, stationary shells or troughs, muller mixers, which are either batch type or continuous type, impact mixers and the like. The mixing of the solid particles components can be conducted during any suitable time period necessary to properly homogenize the mixture. Generally, however, the blending time is usually less than 60 minutes. Preferably, the mixing time will be in the range of from about 2 minutes to about 30 minutes.

Any suitable concentration of phosphating agent can be utilized to produce the treated alumina. The phosphating agent utilized in the treating of the alumina can be selected from the group consisting of phosphoric acid and phosphates, wherein said phosphoric acid includes orthophosphoric acid, pyrophosphoric acid, and polyphosphoric acid and wherein said phosphates include salts of phosphoric acids and metal phosphates represented by the formula $M_{n+2}P_nO_{3n+1}$, wherein M is a metal compound, P is phosphorous, O is oxygen, and n is an integer number greater than zero (0). Furthermore, those phosphating agents earlier described herein can also be utilized as suitable phosphating agents.

The phosphating agent utilized in the treating of the alumina material can also be an aqueous phosphating solution of a compound selected from the group consisting of phosphoric acid and ammonium phosphate. When the phosphating agent is an aqueous phosphating solution, a preferred concentration of the phosphating agent in said aqueous phosphating solution can be any suitable concentration which provides the desired amount of aluminum phosphate in the final composition of matter described herein. One preferred concentration range of the phosphating agent in the aqueous phosphating solution can be in the range of from 0.1 grams of phosphating agent per gram of total phosphating solution to about 0.5 grams of phosphating agent per total grams of phosphating solution. Preferably, the concentration of said phosphating agent in said aqueous phosphating solution can be in the range of from about 0.2 grams of phosphating agent per gram of total phosphating solution to about 0.35 grams of phosphating agent per gram of total phosphating solution. The most preferred concentration range of the phosphating agent in the aqueous phosphating solution in terms of grams of phosphating agent per gram of total phosphating solution is from 0.25 to 0.30. It is desirable to have a sufficient amount of the phosphating agent present during the treating of the alumina material to provide a treated alumina having from an effective quantity of aluminum phosphate upwardly to about 50 weight percent aluminum phosphate. Preferably, from about 4 to about 25 weight percent aluminum phosphate can be present and, most preferably, from about 5 to about 10 weight percent aluminum phosphate can be present.

The thus treated alumina can then be mixed with zinc oxide to produce a mixture comprising zinc oxide and the treated alumina. The mixing of the zinc oxide and treated alumina should be done to form a homogeneous mixture. Any suitable method for mixing the compents can be used to provide the homogeneous mixture. Such suitable types of solids-mixing machines can include, but are not limited to, tumblers, stationary shells or troughs, muller mixers, which are either batch type or continuous type, impact mixtures, and the like. The mixing of the solid particles components can be conducted during any suitable time period necessary to properly homogenize the mixture. Generally, however, the blending time is usually less than 60 minutes. Preferably, the mixing time will be in the range of from about 2 minutes to about 30 minutes.

The mixture produced by mixing the treated alumina and zinc oxide can thereafter be agglomerated to form an agglomerate. Any suitable method for aggolmerating can be used to provide an agglomerate. The agglomeration is basically utilized to enlarge the size of the absorption material particles and to form them into relatively permanent masses having a certain desirable form, such as spheres, pill or tablets, cylinders, irregular extrusions or merely loosely bound aggregates or clusters. Examples of such methods of agglomeration include, but are not limited to, molding, tableting, pressing, pelletizing, extruding and tumbling. When utilizing extrusion methods for agglomeration, any suitable method and extrusion equipment can be used. It is preferred to use either a single-screw extruder or a double-screw extruder, which uses a screw or auger to convey a force for passing the extrusion material through a die plate, to produce desirable shapes or extrusion profiles.

Figure 1:
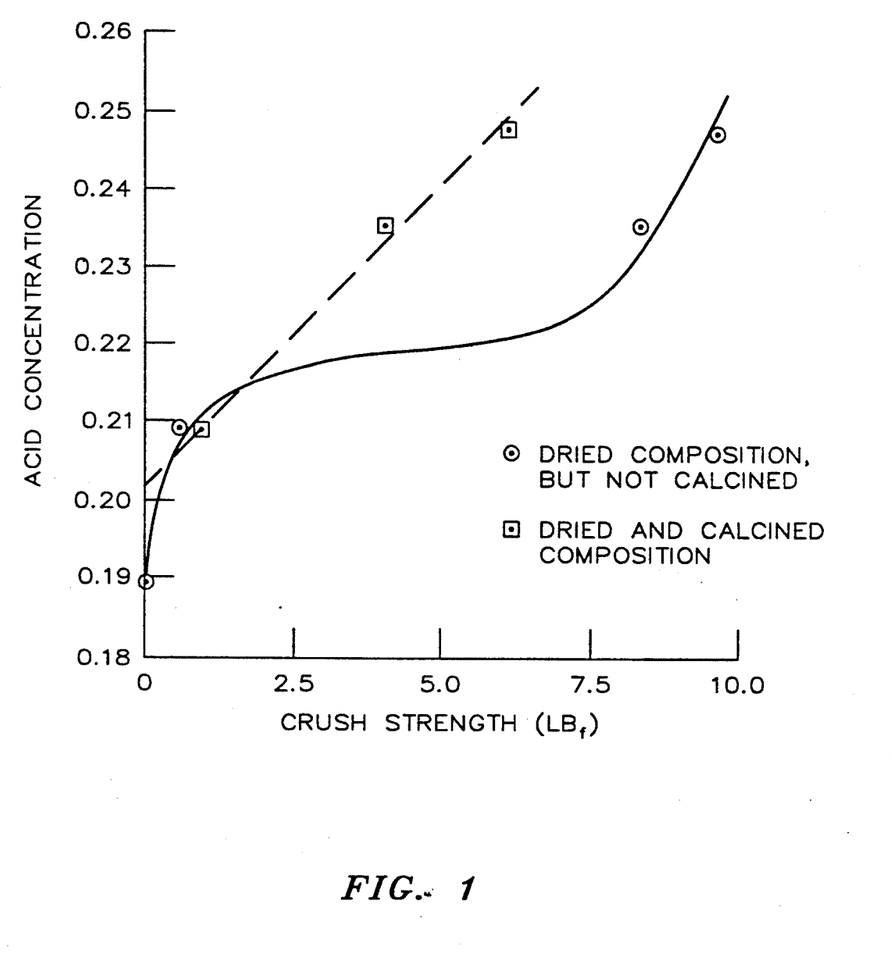
FIG. 1 is a graph showing the relationship between the crush strength of an agglomerated absorbent composition, both before and after calcination, and the extrusion liquid acid concentration.

As an aid for agglomerating the mixture of the components of the composition when extrusion methods are used, as opposed to alternative methods of agglomeration, a suitable acid can be used to prepare an extrudable paste. Such suitable acids can be selected from the group consisting of hydrochloric acid, nitric acid, sulfuric acid, PF5-12-5-91, nitrous acid, lactic acid, acetic acid, carbonic acid, and mixtures of two or more thereof. Dilute solutions or aqueous solutions of such acids can generally be used in the preparation of the agglomerates; and, specifically, it is desirable to use such solutions as agglomeration aids in the precise concentrations that are effective in producing a final agglomerate, which has been either dried or calcined, or both, having a desirable crush strength. It is noted that the acid concentration utilized during the agglomeration step of preparing the herein described composition is a critical aspect of this invention with the criticality of such acid concentration being reflected in FIG. 1. In preparing a composition with the desirable crush strength, it is critical that the appropriate acid concentration be utilized in preparing the composition of matter of this invention. As shown in FIG. 1, the crush strength of the composition, both before it is calcined and after it is calcined, is significantly influenced by the acid concentration utilized during the agglomeration step of the composition preparation. The crush strength of the agglomerate is defined as that which is determined by standard ASTM Method D4179-88A entitled "Standard Test Method for Single Pellet Crush Strength of Formed Catalyst Shapes". The standard test method ASTM D4179-88A is incorporated herein by reference.

To provide a dried agglomerate having the desirable crush strength, it is an important part of this invention that during the mixing of a treated alumina with zinc oxide, an amount of aqueous acid solution be added to the components being mixed in an amount effective for allowing agglomeration. Thus, the aqueous acid solution serves a dual purpose in that it aids in the agglomeration of the material and it assists in ultimately providing a dried or calcined material having the desirable property of high crush strength. Any suitable concentration of the acid compound in the aqueous acid solution can be utilized that is effective in producing a dried agglomerate having a crush strength in the range of from about 0.1 $lb_f$ to about 11.0 $lb_f$. Preferably the concentration of aqueous acid solution should be such that the crush strength of the dried agglomerate will range from about 0.5 $lb_f$ to about 10.0 $lb_f$ and, most preferably, the acid concentration should be such that it is effective in producing a dried agglomerate having a crush strength in the range of from 2.5 $lb_f$ to 9.7 $lb_f$.

It has been found that the aqueous acid solution used as an agglomeration aid of this invention should have a concentration of the acid from an effective concentration upwardly to about 0.5 mass units of acid per mass unit of total aqueous acid solution; but, suitably, the acid concentration should range from about 0.18 to about 0.30 mass units of acid per mass unit of total aqueous acid solution. Preferably, however, the acid concentration range as reported in terms of mass units of acid per mass unit of total aqueous acid solution should be from about 0.19 to about 0.26 and, most preferably, it can range from 0.2 to 0.25.

Once these absorbent components are properly mixed and agglomerated, the mixture can advantageously undergo a drying step for removing certain quantities of water. The drying of the agglomerate can be conducted at any suitable temperature for removing excess quantities of water, but preferably, the drying temperature will range from about 150° F. to about 550° F. More preferably, however, the drying temperature shall range from about 190° F. to about 480° F. Generally, the time period for such drying shall range from about 0.5 hour to about 4 hours and, more preferably, the drying time shall range from about 1 hour to about 3 hours. While the method and apparatus used for performing the optional drying step is not a critical aspect of this invention, many of the suitable methods and apparatuses for drying the agglomerate are described at length in Perry's *Chemical Engineers' Handbook*, pages 20-3 through 20-75 (6th edition, 1984).

The wet agglomerate, or the optionally dried agglomerate, is then calcined in the presence of oxygen or an oxygen-containing fluid at a temperature suitable for achieving the desired degree of calcination. For example, generally the temperature shall range from about 700° F. to about 1400° F. More preferably, the calcination temperature shall range from about 900° F. to about 1300° F. The calcination step can be conducted for a period of time suitable for achieving the desired degree of calcination; but, generally, the time for calcination shall range from about 0.5 hour to about 4 hours. Most preferably, the calcination time shall range from about 1 hour to about 3 hours to produce a calcined absorbing composition.

In accordance with another embodiment of the invention, a method of making the absorbent composition can comprise agglomerating a mixture comprising zinc oxide and alumina followed thereafter by treating the thus formed mixture with a phosphating agent as earlier described herein to provide a phosphated mixture, wherein at least a portion of the alumina is converted into aluminum phosphate. The concentration of the compound in the aqueous phosphating solution can be any suitable concentration which gives a phosphated alumina and ultimately an absorbent composition having the desirable properties of high crush strength, high sulfur loading capacity and the ability to be utilized in a sulfur absorption process with a minimum of sulfur slippage. It has been found, however, that the most suitable concentration of the phosphating agent in the aqueous phosphating solution in terms of mass units of the phosphating agent per mass units of total phosphating solution is from about 0.1 to about 0.5, with a preferred range of from about 0.2 to about 0.35; and, most preferably, the concentration range can be from 0.25 to 0.30.

The quantity of phosphating agent to be utilized in the treating of the mixture of zinc oxide and alumina should be such that upwardly to about 50 weight percent of the alumina is converted to aluminum phosphate; but, it is desirable for the amount of alumina converted to aluminum phosphate to range from at least about 5 weight percent to about 50 weight percent. Preferably, however, the amount of phosphating agent utilized in the treating of the zinc oxide and alumina mixture should be such that enough of the alumina is converted to provide for a composition having from effective quantities up to about 50 weight percent aluminum phosphate in the phosphated mixture. Preferably, aluminum phosphate can be present in the composition in the range of from about 4 weight percent to about 25 weight percent; and most preferably, the aluminum phosphate can be present in an amount from about 5 weight percent but less than about 10 weight percent.

The agglomerating of the mixture of zinc oxide and alumina can be performed by any suitable agglomeration method as earlier described herein. To assist in the agglomeration of the mixture, an aqueous acid solution can be used and mixed with the absorbent components in an amount that is effective for allowing agglomeration. The aqueous acid solution utilized in the agglomeration step can be referred to as an agglomeration aid or as an extrusion liquid. This extrusion liquid can be an aqueous solution of an acid compound selected from the group consisting of hydrochloric acid, nitric acid, sulfuric acid, perchloric acid, nitrous acid, lactic acid, acetic acid, carbonic acid, and mixtures of any two or more thereof. But, preferably, the acid compound used in the aqueous acid solution can be acetic acid. As earlier described herein, the acid concentration in the aqueous acid solution is a critical aspect of this invention in that it significantly affects the crush strength of the final agglomerated composition in either its dried condition or its dried and calcined condition. The critical nature of the acid concentration is clearly illustrated in FIG. 1, which shows the crush strength of the agglomerates as a function of acid concentration for both the dried compositions having not been calcined and the dried and calcined compositions. The concentration of the acid in the aqueous acid solution should be any suitable concentration which will provide the ultimate desirable crush strength for the dried or dried and calcined compositions; but, it is recognized that it is preferable to have the highest crush strength achievable. Generally, it is desirable to have a crush strength in the range of from about 0.1 $lb_f$ to about 11.0 $lb_f$. Preferably, the crush strength should range from about 0.5 $lb_f$ to 10.0 $lb_f$. Most preferably, the crush strength will range from 2.5 $lb_f$ to 9.7 $lb_f$.

To achieve a desirable crush strength for the final agglomerated composition, it is generally desirable to utilize an aqueous acid solution as an agglomeration aid during the agglomeration step, having an acid concentration in the range of from an effective concentration up to about 0.5. It is more desirable, however, to have said acid concentration in the range of from about 0.18 to about 0.30. Preferably, the range of the acid concentration should be from 0.19 to 0.26; and, most preferably, the acid concentration should range from 0.2 to 0.25. As used throughout this specification, when referring to the acid concentrations of the aqueous acid solution utilized as an extrusion aid the term is defined as the ratio of the mass of acid per mass of total aqueous acid solution. As can be noted from the graphical data presented in FIG. 1, there is a strong correlation between crush strength of the final agglomerate and the acid concentration utilized during the agglomeration step.

Once these absorbent components have been properly agglomerated and thereafter treated, the treated or phosphated mixture can advantageously undergo a drying step for removing certain quantities of water. The drying of the agglomerate can be conducted at any suitable temperature for removing excess quantities of water, but preferably, the drying temperature will range from about 150° F. to about 550° F. More preferably, however, the drying temperature shall range from about 190° F. to about 480° F. Generally, the time period for such drying shall range from about 0.5 hour to about 4 hours and, more preferably, the drying time shall range from about 1 hour to about 3 hours. While the method and apparatus used for performing the optional drying step is not a critical aspect of this invention, many of the suitable methods and apparatuses for drying the agglomerate are described at length in Perry's *Chemical Engineers' Handbook*, pages 20-3 through 20-75 (6th edition, 1984).

The phosphated mixture can be calcined under conditions suitable for providing a calcined agglomerate having properties effective for removing hydrogen sulfide from a fluid stream having a concentration of hydrogen sulfide, with a minimum amount of sulfur slippage when said fluid stream is contacted with said calcined agglomerate. The calcination can be performed in the presence of oxygen or an oxygen-containing fluid at a temperature suitable for achieving the desired degree of calcination. For example, generally the temperature shall range from about 700° F. to about 1400° F. More preferably, the calcination temperature shall range from about 900° F. to about 1300° F. The calcination step can be conducted for a period of time suitable for achieving the desired degree of calcination, but generally, the time for calcination shall range from about 0.5 hour to about 4 hours. Most preferably, the calcination time shall range from about 1 hour to about 3 hours to produce a calcined absorbing composition.

In accordance with another preferred embodiment of the inventive method of making the absorbent composition, a treated mixture is prepared by mixing zinc oxide, alumina and a phosphating agent to produce a treated mixture which thereafter undergoes an agglomerating step.

In mixing the components of zinc oxide, alumina and a phosphating agent it is desirable to provide weight quantities of zinc oxide and alumina in such proportions that the weight ratio of alumina to zinc oxide utilized in the mixing step be in the range of from about 0.6-to-1 to about 2.4-to-1. Preferably, the weight ratio of the components alumina to zinc oxide will be in the range of from about 0.8-to-1 to about 1.9-to-1; but, most preferably, the weight ratio of the components of alumina to zinc oxide can be from 1-to-1 to 1.5-to-1. As earlier described herein, it is a desirable and novel aspect of this invention to convert at least a portion of the starting alumina material to give a final composition having an aluminum phosphate content in accordance with the ranges earlier recited herein. In order to convert at least a portion of the starting alumina material to aluminum phosphate, a phosphating agent is used in such a quantity and concentration to produce a treated mixture.

The phosphating agent utilized in the treating of the alumina can be selected from the group consisting of phosphoric acid and phosphates, wherein said phosphoric acid includes orthophosphoric acid, pyrophosphoric acid, and polyphosphoric acid and wherein said phosphates include salts of phosphoric acids and metal phosphates represented by the formula $M_{n-2}P_nO_{3n-1}$, wherein M is a metal compound, P is phosphorous, O is oxygen, and n is an integer number greater than zero (0). Furthermore, those phosphating agents earlier described herein can also be utilized as suitable phosphating agents.

The phosphating agent utilized in the treating of the alumina material can also be an aqueous phosphating solution of a compound selected from the group consisting of phosphoric acid and ammonium phosphate. When the phosphating agent is an aqueous phosphating solution, a preferred concentration of the phosphating agent in said aqueous phosphating solution can be any suitable concentration which provides the desired amount of aluminum phosphate in the final composition of matter. One preferred concentration range of the phosphating agent in the aqueous phosphating solution can be in the range of from 0.1 grams of phosphating agent per gram of total phosphating solution to about 0.5 grams of phosphating agent per total grams of phosphating solution. Preferably, the concentration of said phosphating agent in said aqueous phosphating solution can be in the range of from about 0.2 grams of phosphating agent per gram of total phosphating solution to about 0.35 grams of phosphating agent per gram of total phosphating solution. The most preferred concentration range of the phosphating agent in the aqueous phosphating solution in terms of grams of phosphating agent per gram of total phosphating solution is from 0.25 to 0.30. It is desirable to have a sufficient amount of the phosphating agent present during the treating of the alumina material to provide a treated alumina having from an effective quantity of aluminum phosphate upwardly to about 50 weight percent aluminum phosphate. An effective concentration of aluminum phosphate in the final composition of matter of this invention will generally range from about 3 to about 50 weight percent. Preferably, the concentration of aluminum phosphate will range from about 4 to about 25 weight percent aluminum phosphate and, most preferably, from about 5 to about 10 weight percent aluminum phosphate.

The treated mixture produced by mixing zinc oxide, alumina and a phosphating agent can thereafter be agglomerated to form an agglomerate. Any suitable method for agglomerating as earlier described herein can be used to provide an agglomerate. The agglomerate of said treated mixture can also be calcined under the conditions described herein to produce a calcined agglomerate having properties effective for removing hydrogen sulfide from a fluid stream having a concentration of hydrogen sulfide with a minimum amount of sulfur slippage when said fluid stream is contacted with said calcined agglomerate.

The process according to this invention can suitably process any type of fluid stream containing contaminating concentrations of sulfur compounds. Such sulfur compounds can include, for example, hydrogen sulfide, carbonyl sulfide, sulfur dioxide, carbon disulfide, mercaptans and mixtures of any two or more thereof. Any suitable fluid stream containing contaminating concentrations of sulfur compounds can be processed in this invention. Suitable fluids can include, for example, natural gas, synthesis gas, hydrocarbons, and tail gas from Claus reaction processes. Such suitable fluids or fluid streams can contain sulfur compounds in the concentration range upwardly to about 2 mol percent. It is preferred that a fluid stream containing a concentration of hydrogen sulfide be utilized in this invention. Generally, the concentration of the hydrogen sulfide in such a fluid stream will range upwardly to about 60,000 parts per million by volume (ppmv). The term "parts per million by volume" as used herein is defined as being 1 part by volume per 1 million parts by volume of the reference fluid stream. Preferably, the concentration of the hydrogen sulfide will range from 5000 ppmv to 40,000 ppmv and, most preferably, the concentration of the hydrogen sulfide will range from 5000 ppmv to 20,000 ppmv.

The sulfur contaminated fluid stream can be contacted the absorbent composition by any suitable contacting means such as, for example, a reactor vessel having provided therein the absorbent compositions of this invention, under conditions that are suitable for removing at least a portion of the contaminating concentration of sulfur compounds in the fluid stream. The operating conditions under which the contacting step is conducted can be any suitable temperature, pressure or space velocity that will provide the desired sulfur removal. The operating temperature or contact temperature will generally be in the range of from about 300° F.

to about 1100° F. and will more preferably be in the range of from about 400° F. to about 840° F. Any suitable operating pressure can be used but generally it shall range from about atmospheric pressure to about 2000 psia.

Any suitable space velocity for the sulfur-containing fluid stream in the presence of the absorption composition of the present invention can be utilized. The space velocity, which is expressed as volumes of fluid at standard temperature and pressure per volume of absorbing compositions per hour will generally be in the range of from about 10 to about 10,000 and will more preferably be in the range of from 250 to 2500.

The resultant effluent stream produced by the method described herein will generally have a reduced concentration of contaminating hydrogen sulfide and of sulfur dioxide that passes through the absorption material unabsorbed. While some of the sulfur dioxide present in the effluent stream can be sulfur dioxide that was present in the fluid stream being contacted with the absorption composition, much of the sulfur dioxide present in the effluent stream can be the result of sulfur slippage. The term "sulfur slippage" as used herein is defined as that amount of hydrogen sulfide, which is present in the fluid stream being contacted with the absorption composition, that is converted into sulfur dioxide by the result of a reaction with the active ingredients contained within the absorption composition and that passes unabsorbed along with the effluent stream from contacting means. It is most desirable to have the amount of sulfur slippage minimized while simultaneously maximizing the amount of sulfur absorption upon the absorbent material. The novel composition and method described herein provides the beneficial and unexpected result of minimizing the amount of sulfur slippage that occurs in a sulfur absorption process. Generally, sulfur slippage will be less than 1000 ppmv; however, it is most preferably to have a sulfur slippage of less than 5000 ppmv and, most preferably, the sulfur slippage should be less than 100 ppmv.

The following examples are presented to further illustrate the invention.

EXAMPLE I

This example illustrates the preparation of the absorbent composition of this invention.

113 grams of phosphoric acid (containing about 85 weight % $H_3PO_4$ and about 15 weight % $H_2O$) was diluted with 215 grams of water and mixed with 633 grams of Catapal D alumina (having a BET/$N_2$ surface area of about 250 $m^2/g$; commercially available from Vista Chemical Company, a subsidary of RWE-DEA, Houston, Texas) for about 30 minutes in a mix-muller. To this mixture containing phosphated alumina were added 501.6 grams of zinc oxide and thereafter 47.6 grams of acetic acid and 145 grams of water. The entire mixture was thoroughly mixed for about 15 minutes, allowed to age at room temperature for about 30 minutes, and extruded using a Bonnot laboratory extruder equipped with a Ryton ® poly(phenylene sulfide) die having four $\frac{1}{8}$-inch holes. The extrudate was first dried overnight at about 284° F. and then calcined in air for about 3 hours at about 1175° F.

The calcined extrudate was then impregnated with 50 grams of an aqueous solution containing 15.8 grams of $Ni(NO_3)_2.6H_2O$. The thus impregnated material was dried overnight at about 302° F. and then calcined in air for 3 hours at about 1175° F. The average crush strength of the Ni-impregnated particles, determined by means of a mechanical force gauge, was 2.65 lb. (±0.4 lb).

The preparations A through G were prepared by the method generally described above in Example I with the details as to the quantities and amounts of the various components of the compositions or preparations being provided in Tables I, II and III. Provided in Table I are the amounts and compositions of phosphating solutions used in making absorbent preparations A through G and the amounts of alumina treated or phosphated. Table II provides details relating to the mixing of the zinc oxide and phosphated alumina along with a dilute acetic acid aqueous solution. The data presented in Table III gives details as to the physical properties of the dried and calcined agglomerations of preparations A through G. The data given in Table III indicate that the crush strength of the preparations which have been dried or calcined is affected by the concentration of the acid utilized in the mixing of the zinc oxide and the phosphated alumina. The crush strengths of the preparations as they are influenced by the acid concentration are plotted in FIG. 1.

TABLE I

| Preparation | Water (grams) | 85% $H_3PO_4$ (grams) | Acid Conc. | Alumina (grams) | Ratio Acid/Alum. |
|---|---|---|---|---|---|
| A | 362 | 227 | 0.328 | 1266.7 | 0.465 |
| B | 408.6 | 227 | 0.304 | 1266.7 | 0.502 |
| C | 454 | 227 | 0.283 | 1266.7 | 0.538 |
| D | 249.7 | 113.5 | 0.266 | 633.33 | 0.573 |
| E | 250 | 113.5 | 0.265 | 633.33 | 0.574 |
| F | 225 | 113 | 0.284 | 633.33 | 0.534 |
| G | 215 | 113 | 0.293 | 633.33 | 0.518 |

TABLE II

| Preparation | ZnO (grams) | Ratio Al/ZnO | Water (grams) | Acetic Acid (grams) | Acid Conc. | Ratio Acid/Mix |
|---|---|---|---|---|---|---|
| A | 1003.3 | 1.263 | 363.0 | 0.0 | 0.000 | 0.160 |
| B | 1003.3 | 1.263 | 408.6 | 0.0 | 0.000 | 0.180 |
| C | 1003.3 | 1.263 | 454.0 | 0.0 | 0.000 | 0.200 |
| D | 501.67 | 1.262 | 204.3 | 47.7 | 0.189 | 0.222 |
| E | 501.67 | 1.262 | 180.0 | 47.7 | 0.209 | 0.201 |
| F | 501.67 | 1.262 | 155.0 | 47.6 | 0.235 | 0.179 |
| G | 501.67 | 1.262 | 145.0 | 47.6 | 0.247 | 0.170 |

TABLE III

| Preparation | Dried Cr. Stg. | Calc. Cr. Stg. | Water Pore Vol. |
|---|---|---|---|
| A | | too dry to extrude | |
| B | | too dry to extrude | |
| C | 0.55 | 0.77 | NA |
| D | 0.11 | — | NA |
| E | 0.50 | 0.95 | NA |
| F | 8.28 | 4.08 | 0.425 |

TABLE III-continued

| Preparation | Dried Cr. Stg. | Calc Cr. Stg. | Water Pore Vol |
|---|---|---|---|
| G | 9.70 | 6.12 | 0.411 |

EXAMPLE II

This example illustrates the use of the novel compositions of this invention in a process for absorbing hydrogen sulfide from a fluid stream.

A reactor was filled with a 5 cc volume bottom layer of inert quartz chips on top of which was placed a 10 cc volume (approximately 10 grams) layer of the particular absorbing composition. The reactor, which was maintained at a pressure of about 1.7 psig, was operated in a fixed bed, downflow mode. Within the reactor, the absorbing composition was heated to the desired operating temperature by an electric furnace. During the heating process, the absorbing composition was maintained under a nitrogen flow. When the desired temperature of about 800° F. to 850° F. was attained, the nitrogen flow was stopped, and a simulated sulfur plant gas and, when used, water vapor flows were started. The water vapor was generated by pumping water through a heated line that was connected to the top of the reactor. The reaction was carried out at a reaction temperature in the range of from about 800° F. to 850° F. and a gas hourly space velocity of 2500 cc/cc absorbent/hour. The approximate composition of the simulated sulfur plant gas was as follows: 1.4 volume percent hydrogen sulfide, 13.3 volume percent carbon dioxide, and 85.3 volume percent nitrogen or 1.4 volume percent hydrogen sulfide and 98.6 volume percent nitrogen.

The absorbing composition was used in a cyclic manner. A complete process cycle consists of a contacting step whereby an $H_2S$ containing stream is brought into contact with the absorption composition and in which chemi-absorption takes place and a regeneration step. Once the chemi-absorption reaction is complete, as can sometimes be evidenced by an increase in the amount of $H_2S$ that breaks through the bed of absorbing composition, the fluid stream being treated is discontinued and the absorbing composition is regenerated by passing a gas containing free oxygen in contact with the absorption composition. The oxygen contained in the regeneration gas serves to convert the absorbed sulfur to an oxide compound, and to drive from the absorption material the absorbed sulfur in the form of SOx.

The progress of the absorption was followed by measuring the concentration of hydrogen sulfide in the reactor effluent after the water vapor had been condensed and removed from the effluent. The concentration of hydrogen sulfide or sulfur dioxide, or both, was measured with commercially available Draeger tubes that were suited to the concentration ranges encountered and in accordance with the manufacturer's recommendations.

Once each absorbing composition became fully sulfided, as evidenced by hydrogen sulfide breakthrough, the flow of the simulated sulfur plant gas to the reactor was halted, and the reactor was purged with nitrogen for a period of 20 minutes while being heated to a regeneration temperature of about 1170° F. The sulfided absorbing composition was then regenerated in the presence of air for about 1.5 hours. Following regeneration, the reactor was again purged with nitrogen for 40 minutes while being cooled back down to the reaction temperature in the range of about 800° F. to about 850° F. The nitrogen purge was then halted and the simulated sulfur plant gas was fed to the reactor to begin another absorption cycle.

This example illustrates the use of the absorbing composition prepared in the manner described in Example I for the removal of $H_2S$ from a simulated sulfur plant gas stream. The results present the amount of sulfur dioxide present in the treated effluent gaseous stream (measured in ppm) at a time of ten (10) minutes into a cycle. The sulfur loading is the weight percent of sulfur present on the absorption material at the time when hydrogen sulfide breaks through the absorbent bed. This is essentially the absorption capacity of the absorbent material. The test results are summarized in Table I.

TABLE IV

| Notebook Number | Cylinder % $H_2S$ | Weight Absorbent, g | Blend $N_2$ cc/min | $H_2S$ cc/min | @10 min. $SO_2$, ppm | 100 ppm $H_2S$ t. min. | Total S, % | S as $SO_2$, % | S as ZnS, % |
|---|---|---|---|---|---|---|---|---|---|
| 1 | 4.28 | 10 | 242 | 195 | 0 | 68 | 8.1 | 0.0 | 8.1 |
| $SO_2$ at breakthrough 10 ppm $SO_2$ | | | | | | | | | |
| 2 | 4.28 | 10 | 242 | 195 | 900 | 77 | 9.2 | 0.4 | 8.7 |
| $SO_2$ at breakthrough 1200 ppm $SO_2$ | | | | | | | | | |
| 7 | 4.28 | 10 | 242 | 195 | 1000 | 66 | 7.9 | 0.4 | 7.5 |
| $SO_2$ at breakthrough 700 ppm $SO_2$ | | | | | | | | | |
| 8 | 4.28 | 10 | 242 | 195 | 950 | 66 | 7.9 | 0.4 | 7.5 |
| $SO_2$ at breakthrough 1400 ppm $SO_2$ | | | | | | | | | |
| 13 | 4.28 | 10 | 242 | 195 | 900 | 60 | 7.1 | 0.3 | 6.8 |
| $SO_2$ at breakthrough 1000 ppm $SO_2$ | | | | | | | | | |

The data present in Table IV show the absorption performance of a composition comprising fifty parts by weight zinc oxide and fifty parts by weight alumina of which ten percent of the alumina is in the form of a phosphated alumina. Table IV shows that the novel absorption mixture provides for a low sulfur slippage, which is the amount of hydrogen sulfide that is oxidized to sulfur dioxide during the absorption cycle.

Reasonable variations and modifications are possible within the scope of this disclosure without departing from the scope and spirit thereof.

That which is claimed is:

1. A method of making a sulfur absorbent composition containing an agglomerated mixture of zinc oxide, alumina and aluminum phosphate, comprising the steps of:
   (a) treating an alumina material with a phosphating agent in an amount sufficient to produce a treated alumina with aluminum phosphate present in the range of from about 3 to about 50 weight percent;
   (b) mixing zinc oxide with said treated alumina with the amount of zinc oxide mixed with said treated alumina being determined by a weight ratio of said alumina material to said zinc oxide in the range of from about 0.6-to-1 to about 2.4-to-1 to produce a mixture comprising zinc oxide and said treated alumina;

(c) agglomerating said mixture to form an agglomerate; and (d) adding an aqueous acid solution with said zinc oxide during said mixing step (b) in an amount effective for allowing agglomeration thereby producing said sulfur absorbent composition.

2. A method as recited in claim 1 further comprising:

(e) drying said agglomerate under conditions suitable for providing a dried agglomerate.

3. A method as recited in claim 2 further comprising:

(f) calcining said dried agglomerate under conditions suitable for providing a calcined agglomerate having properties effective for removing hydrogen sulfide from a fluid stream having a concentration of hydrogen sulfide, with a minimum amount of sulfur slippage when said fluid stream is contacted with said calcined agglomerate.

4. A method as recited in claim 3 wherein said phosphating agent is selected from the group consisting of phosphoric acid and phosphates wherein said phosphoric acid includes orthophosphoric acid, pyrophosphoric acid, and polyphosphoric acid and wherein said phosphates include salts of phosphoric acid and metal phosphates represented by the formula $M_{n-2}P_nO_{3n-1}$, wherein M is a metal or metal compound, P is phosphorous, O is oxygen, and n is an integer greater than zero.

5. A method as recited in claim 4 wherein said phosphating agent is an aqueous phosphating solution of a compound selected from the group consisting of phosphoric acid and ammonium phosphate.

6. A method as recited in claim 5 wherein the concentration of said compound in said aqueous phosphating solution in terms of grams of phosphating agent per gram of total aqueous phosphating solution is in the range of from about 0.10 to about 0.50.

7. A method as recited in claim 6 wherein said aqueous acid solution is an acid compound selected from the group consisting of hydrochloric acid, nitric acid, sulfuric acid, perchloric acid, nitrous acid, lactic acid, acetic acid, carbonic acid, and mixtures of two or more thereof.

8. A method as recited in claim 7 wherein said aqueous acid solution has a concentration of said compound in the range of from about 0.18 to about 0.30 and wherein the aqueous acid solution concentration is defined as the ratio of the mass of the acid component to the mass of the total aqueous acid solution.

9. A method as recited in claim 8 wherein said acid compound is acetic acid.

10. A method as recited in claim 9 wherein said adding step (d) utilizes said aqueous acid solution in an amount effective for producing said dried agglomerate having a crush strength in the range of from about 0.1 to about 11 lbs.

11. A method as recited in claim 10 wherein said adding step (d) utilizes said aqueous acid solution in an amount effective for producing said calcined agglomerate having a crush strength in the range of from about 0.5 to about 6.5 pounds.

12. A method as recited in claim 11 wherein said agglomeration step (c) is selected from the group of process steps consisting of molding, tableting, pressing, pelletizing, extruding, and tumbling.

13. A method as recited in claim 12 wherein said agglomerating step (c) is extruding.

14. A method of making a sulfur absorbent composition containing an agglomerated mixture of zinc oxide, alumina and aluminum phosphate, comprising the steps of:

(a) agglomerating a mixture comprising zinc oxide and alumina wherein the weight ratio of alumina to zinc oxide in said mixture is in the range of from about 0.5-to-1 to about 2.4-to-1; and (b) thereafter, treating said mixture with an aqueous solution of a phosphating agent to provide a phosphated mixture wherein said alumina is converted to provide aluminum phosphate present in the range of from about 3 to about 50 weight percent thereby producing said sulfur absorbent composition.

15. A method as recited in claim 14 wherein said phosphating agent is selected from the group consisting of phosphoric acid and phosphates wherein said phosphoric acid includes orthophosphoric acid, pyrophosphoric acid, and polyphosphoric acid and wherein said phosphates include salts of phosphoric acid and metal phosphates represented by the formula $M_{n-2}P_nO_{3n-1}$, wherein M is a metal or metal compound, P is phosphorous, O is oxygen, and n is an integer greater than zero.

16. A method as recited in claim 15 wherein said phosphating agent is selected from the group consisting of phosphoric acid and ammonium phosphate.

17. A method as recited in claim 16 wherein said treating step (b) utilizes a sufficient amount of said phosphating agent to provide said phosphated mixture with aluminum phosphate present in the range of from about 3 to about 50 weight percent.

18. A method as recited in claim 17 wherein said agglomerating step (a) utilizes an amount of an aqueous acid solution effective for allowing agglomeration.

19. A method as recited in claim 18 wherein said aqueous acid solution is an aqueous solution of an acid compound selected from the group consisting of hydrochloric acid, nitric acid, sulfuric acid, perchloric acid, nitrous acid, lactic acid, acetic acid, carbonic acid, and mixtures of two or more thereof.

20. A method as recited in claim 19 further comprising:

calcining said phosphated mixture under conditions suitable for providing a calcined agglomerate having properties effective for removing hydrogen sulfide from a fluid stream having a concentration of hydrogen sulfide, with a minimum amount of sulfur slippage when said fluid stream is contacted with said calcined agglomerate.

21. A method of making a sulfur absorbent composition containing an agglomerated mixture of zinc oxide, alumina and aluminum phosphate, comprising the steps of:

(a) mixing zinc oxide, alumina, and a phosphating agent to produce a treated mixture wherein the weight ratio of the alumina to the zinc oxide mixed is in the range of from about 0.6-to-1 to about 2.4-to-1 and wherein the amount of the phosphating agent mixed is such as to provide said treated mixture having a concentration of aluminum phosphate in the range of from about 3 to about 50 weight percent; and (b) agglomerating said treated mixture thereby producing said sulfur absorbent.

22. A method as recited in claim 21 wherein said phosphating agent is selected from the group consisting of phosphoric acid and phosphates wherein said phosphoric acid includes orthophosphoric acid, pyrophosphoric acid, and polyphosphoric acid and wherein said phosphates include salts of phosphoric acid and metal phosphates represented by the formula $M_{n-2}P_nO_{3n-1}$, wherein M is a metal or metal compound, P is phosphorous, O is oxygen, and n is an integer greater than zero.

23. A method as recited in claim 22 wherein said phosphating agent is an aqueous phosphating solution of a compound selected from the group consisting of phosphoric acid and ammonium phosphate.

24. A method as recited in claim 23 wherein the concentration of said compound in said aqueous phosphating solution in terms of grams of phosphating agent per gram of total aqueous phosphating solution is in the range of from about 0.10 to about 0.50.

25. A method as recited in claim 24 further comprising:
    calcining said treated mixture under conditions suitable for providing a calcined agglomerate having properties effective for removing hydrogen sulfide from a fluid stream having a concentration of hydrogen sulfide, with a minimum amount of sulfur slippage when said fluid stream is contacted with said calcined agglomerate.

26. A composition prepared by the method of claim 1.
27. A composition prepared by the method of claim 2.
28. A composition prepared by the method of claim 3.
29. A composition prepared by the method of claim 4.
30. A composition prepared by the method of claim 5.
31. A composition prepared by the method of claim 6.
32. A composition prepared by the method of claim 7.
33. A composition prepared by the method of claim 8.
34. A composition prepared by the method of claim 9.
35. A composition prepared by the method of claim 10.
36. A composition prepared by the method of claim 11.
37. A composition prepared by the method of claim 12.
38. A composition prepared by the method of claim 13.
39. A composition prepared by the method of claim 14.
40. A composition prepared by the method of claim 15.
41. A composition prepared by the method of claim 16.
42. A composition prepared by the method of claim 17.
43. A composition prepared by the method of claim 18.
44. A composition prepared by the method of claim 19.
45. A composition prepared by the method of claim 20.
46. A composition prepared by the method of claim 21.
47. A composition prepared by the method of claim 22.
48. A composition prepared by the method of claim 23.
49. A composition prepared by the method of claim 24.
50. A composition prepared by the method of claim 25.
51. A composition prepared by the method of claim 26.

52. A agglomerated sulfur absorbent composition having a crush strength of from about 0.1 lb/ to about 10 lb/ and a sulfur loading capacity of at least about 7.1 weight percent, said composition comprising:
    zinc oxide;
    alumina; and
    between about 3 to about 50 weight percent aluminum phosphate.

* * * * *